(12) United States Patent
Dojan

(10) Patent No.: US 8,631,589 B2
(45) Date of Patent: Jan. 21, 2014

(54) ARTICLE OF FOOTWEAR INCORPORATING FLOATING TENSILE STRANDS

(75) Inventor: Frederick J. Dojan, Vancouver, WA (US)

(73) Assignee: Nike, Inc., Beaverton, OR (US)

( * ) Notice: Subject to any disclaimer, the term of this patent is extended or adjusted under 35 U.S.C. 154(b) by 748 days.

(21) Appl. No.: 12/847,860

(22) Filed: Jul. 30, 2010

(65) Prior Publication Data

US 2012/0023786 A1    Feb. 2, 2012

(51) Int. Cl.
   *A43B 23/00*   (2006.01)

(52) U.S. Cl.
   USPC ..................................... 36/45; 36/57; 36/58.6

(58) Field of Classification Search
   USPC ................. 36/45, 58.6, 50.1, 57, 89
   See application file for complete search history.

(56) References Cited

U.S. PATENT DOCUMENTS

| | | | |
|---|---|---|---|
| 975,820 A * | 11/1910 | Azzara | ............................... 36/89 |
| 1,258,629 A | 3/1918 | Bliss | |
| 2,034,091 A | 3/1936 | Dunbar | |
| 2,048,294 A | 7/1936 | Roberts | |
| 2,205,356 A | 6/1940 | Gruensfelder | |
| 2,311,996 A | 2/1943 | Parker | |
| 3,439,434 A | 4/1969 | Tangorra | |
| 3,672,078 A | 6/1972 | Fukuoka | |
| 3,823,493 A | 7/1974 | Brehm et al. | |
| 4,627,369 A | 12/1986 | Conrad et al. | |
| 4,634,616 A | 1/1987 | Musante | |
| 4,642,819 A | 2/1987 | Ales et al. | |
| 4,756,098 A | 7/1988 | Boggia | |
| 4,858,339 A | 8/1989 | Hayafuchi et al. | |
| 4,873,725 A | 10/1989 | Mitchell | |
| 5,149,388 A | 9/1992 | Stahl | |
| 5,156,022 A | 10/1992 | Altman | |
| 5,271,130 A | 12/1993 | Batra | |
| 5,285,658 A | 2/1994 | Altman et al. | |
| 5,345,638 A | 9/1994 | Nishida | |
| 5,359,790 A | 11/1994 | Iverson et al. | |
| 5,367,795 A | 11/1994 | Iverson et al. | |
| 5,380,480 A | 1/1995 | Okine et al. | |
| 5,399,410 A | 3/1995 | Urase | |

(Continued)

FOREIGN PATENT DOCUMENTS

| | | |
|---|---|---|
| CN | 101125044 A | 2/2008 |
| DE | 20215559 | 1/2003 |

(Continued)

OTHER PUBLICATIONS

International Search Report for PCT/US2011/043791 mailed on Nov. 11, 2011.

(Continued)

*Primary Examiner* — Ted Kavanaugh
(74) *Attorney, Agent, or Firm* — Plumsea Law Group, LLC

(57) ABSTRACT

An article of footwear may have a sole structure and an upper that includes at least one layer and a plurality of strands. The layer extends from a lace region of the upper to a lower region of the upper. The strands are located adjacent to the layer and in contact with the layer, and the strands extend from the lace region to the lower region. Additionally, the strands are unsecured to the layer for a distance of at least five centimeters in an area between the lace region and the lower region.

22 Claims, 18 Drawing Sheets

(56) References Cited

U.S. PATENT DOCUMENTS

| | | | | |
|---|---|---|---|---|
| 5,544,430 | A | * | 8/1996 | Jacko ............................ 36/7.1 R |
| 5,645,935 | A | | 7/1997 | Kemper et al. |
| 5,832,540 | A | | 11/1998 | Knight |
| D405,587 | S | | 2/1999 | Merikoski |
| 5,930,918 | A | | 8/1999 | Healy |
| 5,990,378 | A | | 11/1999 | Ellis |
| 6,003,247 | A | | 12/1999 | Steffe |
| 6,004,891 | A | | 12/1999 | Tuppin et al. |
| 6,009,637 | A | | 1/2000 | Pavone |
| 6,029,376 | A | | 2/2000 | Cass |
| 6,038,702 | A | | 3/2000 | Knerr |
| 6,128,835 | A | | 10/2000 | Ritter |
| 6,151,804 | A | * | 11/2000 | Hieblinger ...................... 36/128 |
| 6,164,228 | A | | 12/2000 | Lin |
| 6,170,175 | B1 | * | 1/2001 | Funk ................................. 36/89 |
| 6,213,634 | B1 | | 4/2001 | Harrington et al. |
| 6,615,427 | B1 | | 9/2003 | Hailey |
| 6,665,958 | B2 | | 12/2003 | Goodwin |
| 6,701,644 | B2 | * | 3/2004 | Oorei et al. ..................... 36/129 |
| 6,718,895 | B1 | | 4/2004 | Fortuna |
| 6,860,214 | B1 | | 3/2005 | Wang |
| 6,910,288 | B2 | | 6/2005 | Dua |
| 7,086,179 | B2 | | 8/2006 | Dojan |
| 7,086,180 | B2 | | 8/2006 | Dojan |
| 7,100,310 | B2 | | 9/2006 | Foxen |
| 7,293,371 | B2 | | 11/2007 | Aveni |
| 7,337,560 | B2 | | 3/2008 | Marvin et al. |
| 7,574,818 | B2 | | 8/2009 | Meschter |
| 7,665,230 | B2 | | 2/2010 | Dojan |
| 7,676,956 | B2 | | 3/2010 | Dojan |
| 7,849,518 | B2 | | 12/2010 | Moore et al. |
| 7,870,681 | B2 | | 1/2011 | Meschter |
| 7,870,682 | B2 | | 1/2011 | Meschter et al. |
| 2001/0051484 | A1 | | 12/2001 | Ishida et al. |
| 2002/0148142 | A1 | | 10/2002 | Oorei et al. |
| 2003/0178738 | A1 | | 9/2003 | Staub et al. |
| 2004/0074589 | A1 | | 4/2004 | Gessler et al. |
| 2004/0118018 | A1 | | 6/2004 | Dua |
| 2004/0142631 | A1 | | 7/2004 | Luk |
| 2004/0181972 | A1 | | 9/2004 | Csorba |
| 2004/0261295 | A1 | | 12/2004 | Meschter |
| 2005/0028403 | A1 | | 2/2005 | Swigart |
| 2005/0115284 | A1 | | 6/2005 | Dua |
| 2005/0132609 | A1 | | 6/2005 | Dojan |
| 2005/0268497 | A1 | | 12/2005 | Alfaro |
| 2006/0048413 | A1 | | 3/2006 | Sokolowski et al. |
| 2006/0137221 | A1 | | 6/2006 | Dojan |
| 2007/0199210 | A1 | | 8/2007 | Vattes et al. |
| 2007/0271821 | A1 | | 11/2007 | Meschter |
| 2007/0271822 | A1 | * | 11/2007 | Meschter ......................... 36/45 |
| 2007/0271823 | A1 | | 11/2007 | Meschter |
| 2008/0110049 | A1 | | 5/2008 | Sokolowski et al. |
| 2010/0018075 | A1 | | 1/2010 | Meschter et al. |
| 2010/0037483 | A1 | | 2/2010 | Meschter et al. |
| 2010/0043253 | A1 | | 2/2010 | Dojan |
| 2010/0154256 | A1 | | 6/2010 | Dua |
| 2010/0175276 | A1 | | 7/2010 | Dojan et al. |
| 2010/0251491 | A1 | | 10/2010 | Dojan et al. |
| 2010/0251564 | A1 | | 10/2010 | Meschter |
| 2011/0041359 | A1 | | 2/2011 | Dojan et al. |

FOREIGN PATENT DOCUMENTS

| | | |
|---|---|---|
| DE | 10228143 | 11/2003 |
| EP | 0082824 | 6/1983 |
| EP | 0818289 | 1/1998 |
| FR | 1462349 A | 2/1967 |
| FR | 2046671 | 3/1971 |
| FR | 2457651 A1 | 12/1980 |
| JP | 2007190351 | 8/2007 |
| WO | 9843506 A1 | 10/1998 |
| WO | 03013301 A1 | 2/2003 |
| WO | WO2004089609 | 10/2004 |
| WO | WO2007139567 | 12/2007 |
| WO | WO2007140055 | 12/2007 |

OTHER PUBLICATIONS

International Preliminary Report on Patentability in PCT Application No. PCT/US2011/043791 mailed Feb. 14, 2013.

* cited by examiner

ARTICLE OF FOOTWEAR INCORPORATING FLOATING TENSILE STRANDS

BACKGROUND

Articles of footwear generally include two primary elements: an upper and a sole structure. The upper is often formed from a plurality of material elements (e.g., textiles, polymer sheet layers, foam layers, leather, synthetic leather) that are stitched or adhesively bonded together to form a void on the interior of the footwear for comfortably and securely receiving a foot. More particularly, the upper forms a structure that extends over instep and toe areas of the foot, along medial and lateral sides of the foot, and around a heel area of the foot. The upper may also incorporate a lacing system to adjust fit of the footwear, as well as permitting entry and removal of the foot from the void within the upper. In addition, the upper may include a tongue that extends under the lacing system to enhance adjustability and comfort of the footwear, and the upper may incorporate a heel counter.

The various material elements forming the upper impart specific properties to different areas of the upper. For example, textile elements may provide breathability and may absorb moisture from the foot, foam layers may compress to impart comfort, and leather may impart durability and wear-resistance. As the number of material elements increases, the overall mass of the footwear may increase proportionally. The time and expense associated with transporting, stocking, cutting, and joining the material elements may also increase. Additionally, waste material from cutting and stitching processes may accumulate to a greater degree as the number of material elements incorporated into an upper increases. Moreover, products with a greater number of material elements may be more difficult to recycle than products formed from fewer material elements. By decreasing the number of material elements, therefore, the mass of the footwear and waste may be decreased, while increasing manufacturing efficiency and recyclability.

The sole structure is secured to a lower portion of the upper so as to be positioned between the foot and the ground. In athletic footwear, for example, the sole structure includes a midsole and an outsole. The midsole may be formed from a polymer foam material that attenuates ground reaction forces (i.e., provides cushioning) during walking, running, and other ambulatory activities. The midsole may also include fluid-filled chambers, plates, moderators, or other elements that further attenuate forces, enhance stability, or influence the motions of the foot, for example. The outsole forms a ground-contacting element of the footwear and is usually fashioned from a durable and wear-resistant rubber material that includes texturing to impart traction. The sole structure may also include a sockliner positioned within the upper and proximal a lower surface of the foot to enhance footwear comfort.

SUMMARY

An article of footwear is disclosed below as having an upper and a sole structure secured to the upper. The upper includes at least one layer and a plurality of strands. The layer extends from a lace region of the upper to a lower region of the upper. The strands are located adjacent to the layer and in contact with the layer, and the strands extend from the lace region to the lower region. Additionally, the strands are unsecured to the layer for a distance of at least five centimeters in an area between the lace region and the lower region.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

FIGURE DESCRIPTIONS

The foregoing Summary and the following Detailed Description will be better understood when read in conjunction with the accompanying figures.

DETAILED DESCRIPTION

The following discussion and accompanying figures disclose an article of footwear having an upper that includes tensile strand elements. The article of footwear is disclosed as having a general configuration suitable for walking or running. Concepts associated with the footwear, including the upper, may also be applied to a variety of other athletic footwear types, including baseball shoes, basketball shoes, cross-training shoes, cycling shoes, football shoes, tennis shoes, soccer shoes, and hiking boots, for example. The concepts may also be applied to footwear types that are generally considered to be non-athletic, including dress shoes, loafers, sandals, and work boots. The concepts disclosed herein apply, therefore, to a wide variety of footwear types.

General Footwear Structure

Figure 1:
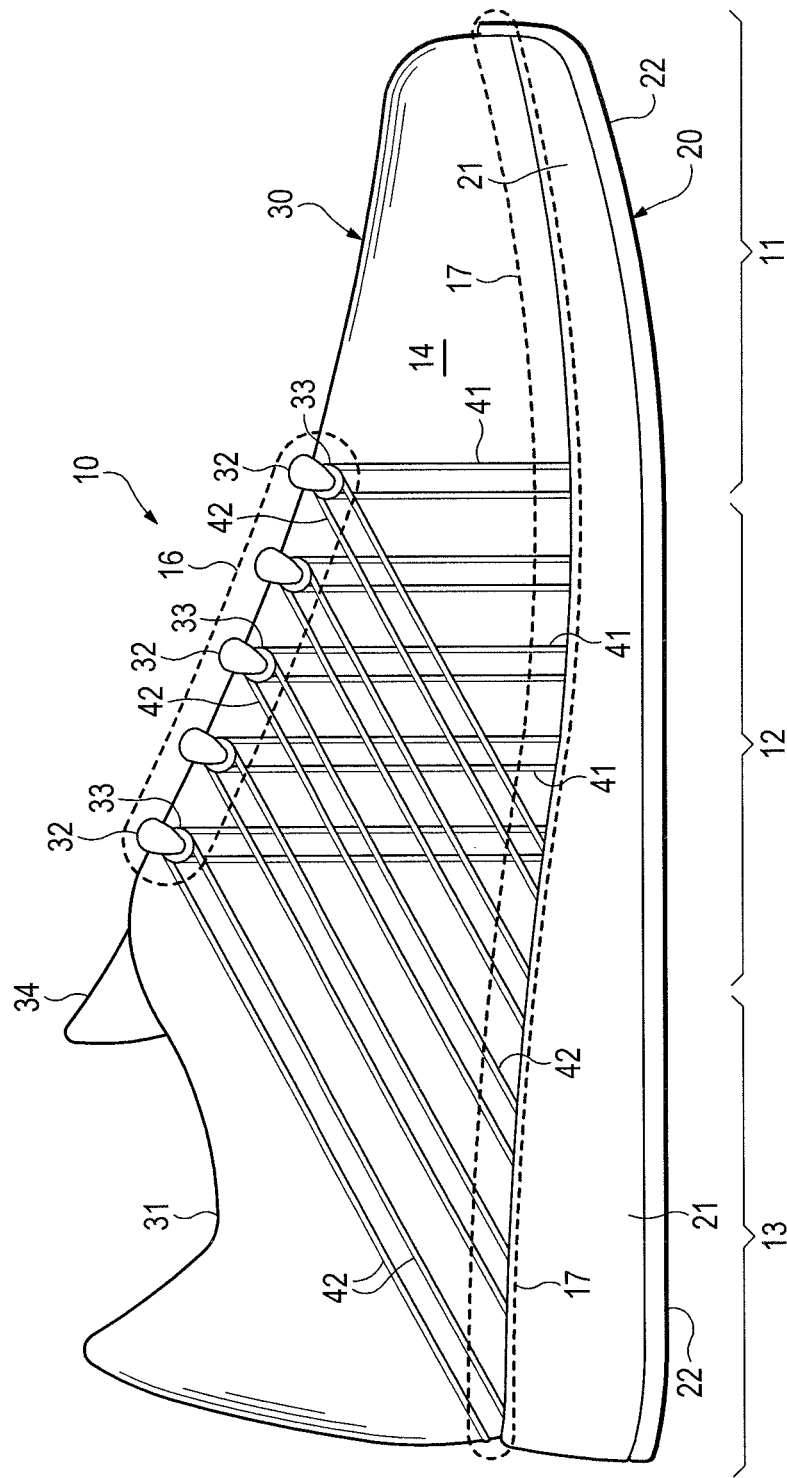
FIG. 1 is a lateral side elevational view of an article of footwear.
Figure 2:
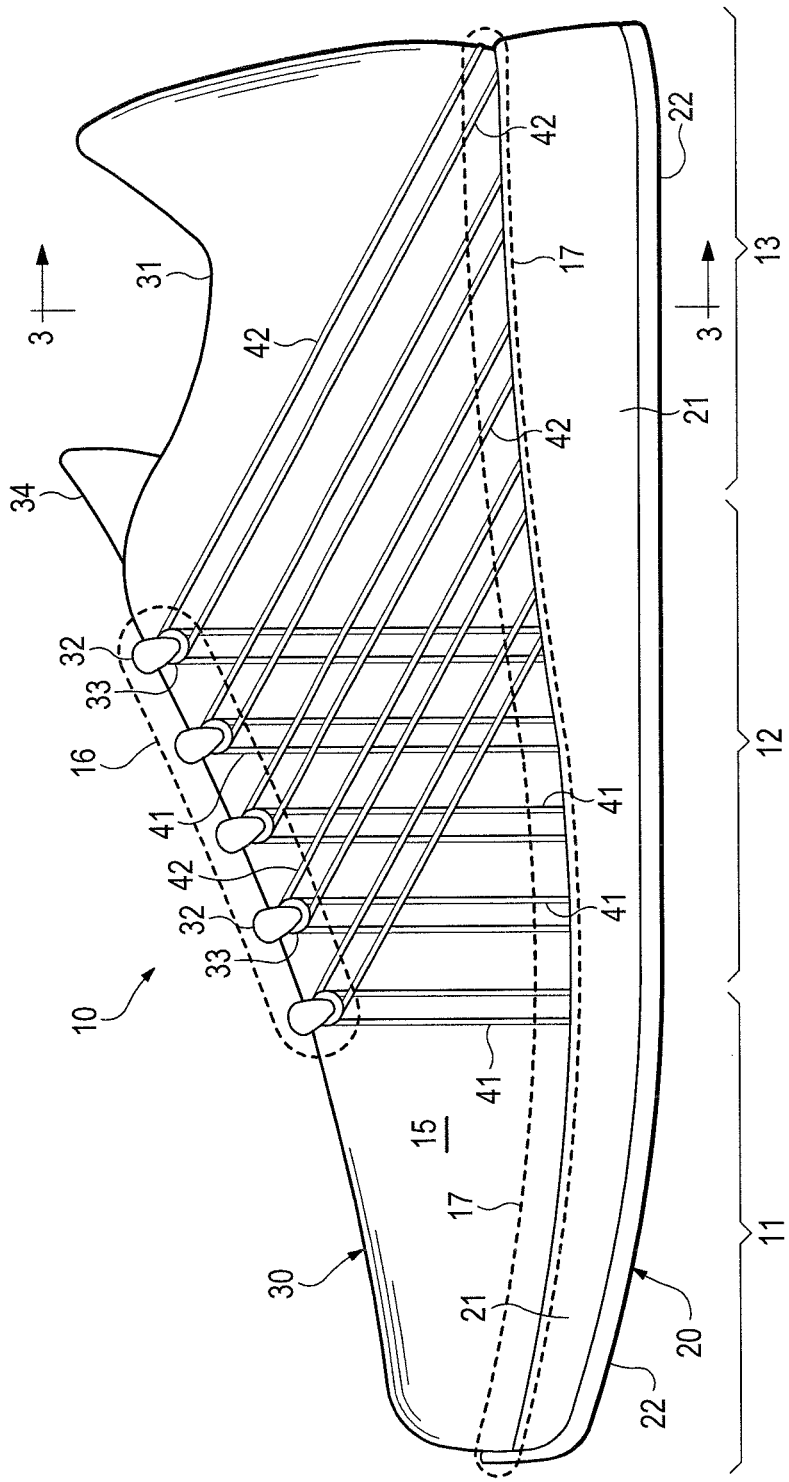
FIG. 2 is a medial side elevational view of the article of footwear.
Figure 3:
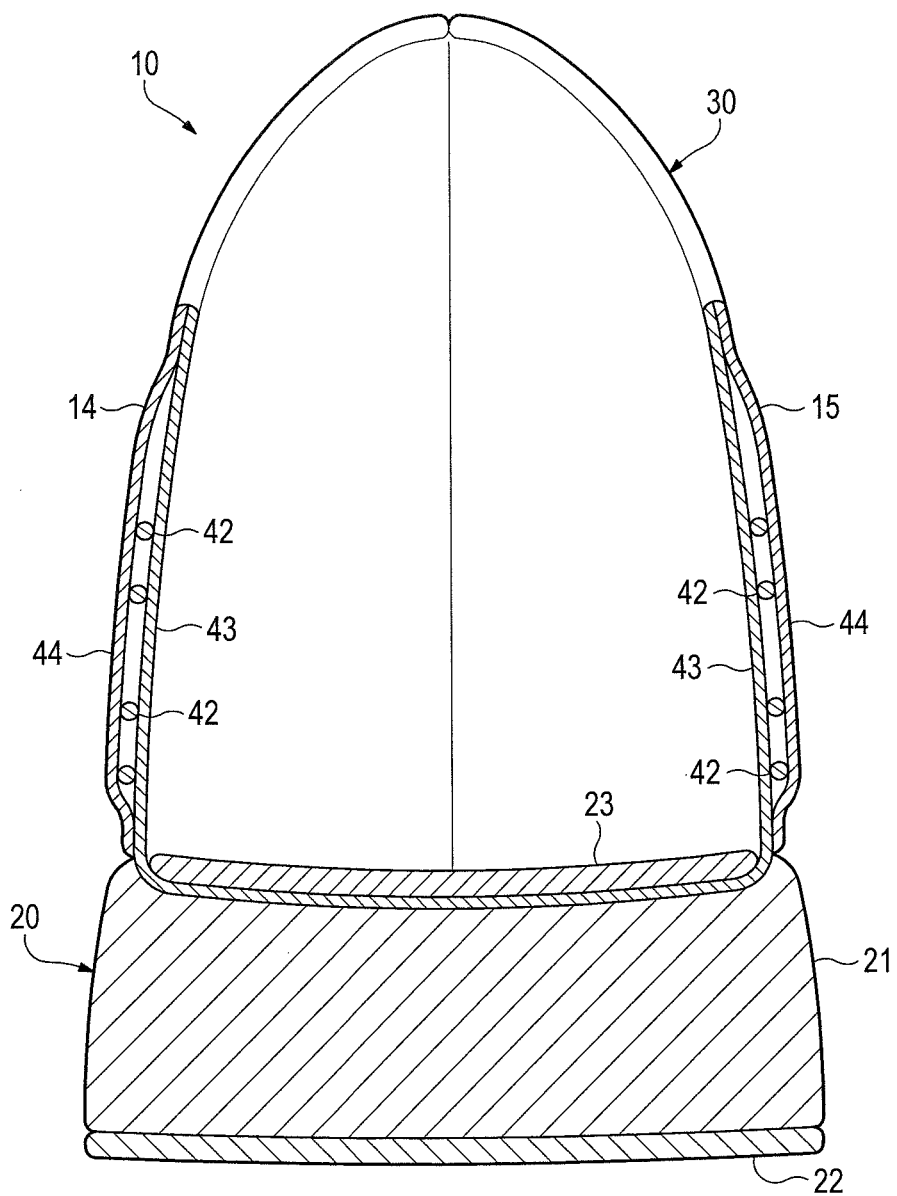
FIG. 3 is a cross-sectional view of the article of footwear, as defined by section line 3-3 in FIG. 2.

An article of footwear 10 is depicted in FIGS. 1-3 as including a sole structure 20 and an upper 30. For reference purposes, footwear 10 may be divided into three general regions: a forefoot region 11, a midfoot region 12, and a heel region 13, as shown in FIGS. 1 and 2. Footwear 10 also includes a lateral side 14 and a medial side 15. Forefoot region 11 generally includes portions of footwear 10 corresponding with the toes and the joints connecting the metatarsals with the phalanges. Midfoot region 12 generally includes portions of footwear 10 corresponding with the arch area of the foot, and heel region 13 corresponds with rear portions of the foot, including the calcaneus bone. Lateral side 14 and medial side 15 extend through each of regions 11-13 and correspond with opposite sides of footwear 10. Regions 11-13 and sides 14-15 are not intended to demarcate precise areas of footwear 10. Rather, regions 11-13 and sides 14-15 are intended to represent general areas of footwear 10 to aid in the following discussion. In addition to footwear 10, regions 11-13 and sides 14-15 may also be applied to sole structure 20, upper 30, and individual elements thereof.

Sole structure 20 is secured to upper 30 and extends between the foot and the ground when footwear 10 is worn. The primary elements of sole structure 20 are a midsole 21, an outsole 22, and an sockliner 23. Midsole 21 is secured to a lower surface of upper 30 and may be formed from a compressible polymer foam element (e.g., a polyurethane or ethylvinylacetate foam) that attenuates ground reaction forces (i.e., provides cushioning) when compressed between the foot and the ground during walking, running, or other ambulatory activities. In further configurations, midsole 21 may incorporate fluid-filled chambers, plates, moderators, or other elements that further attenuate forces, enhance stability, or influence the motions of the foot, or midsole 21 may be primarily formed from a fluid-filled chamber. Outsole 22 is secured to a lower surface of midsole 21 and may be formed from a wear-resistant rubber material that is textured to impart traction. Sockliner 23 is located within upper 30 and is positioned to extend under a lower surface of the foot. Although this configuration for sole structure 20 provides an example of a sole structure that may be used in connection with upper 30, a variety of other conventional or nonconventional configurations for sole structure 20 may also be utilized. Accordingly, the structure and features of sole structure 20 or any sole structure utilized with upper 30 may vary considerably.

The various portions of upper 30 may be formed from one or more of a plurality of material elements (e.g., textiles, polymer sheets, foam layers, leather, synthetic leather) that are stitched or bonded together to form a void within footwear 10 for receiving and securing a foot relative to sole structure 20. The void is shaped to accommodate the foot and extends along the lateral side of the foot, along the medial side of the foot, over the foot, around the heel, and under the foot. Access to the void is provided by an ankle opening 31 located in at least heel region 13. A lace 32 extends through various lace apertures 33 and permits the wearer to modify dimensions of upper 30 to accommodate the proportions of the foot. More particularly, lace 32 permits the wearer to tighten upper 30 around the foot, and lace 32 permits the wearer to loosen upper 30 to facilitate entry and removal of the foot from the void (i.e., through ankle opening 31). As an alternative to lace apertures 33, upper 30 may include other lace-receiving elements, such as loops, eyelets, and D-rings. In addition, upper 30 includes a tongue 34 that extends between the interior void and lace 32 to enhance the comfort of footwear 10. In some configurations, upper 30 may incorporate a heel counter that limits heel movement in heel region 13 or a wear-resistant toe guard located in forefoot region 11.

Referring to FIGS. 1 and 2, for example, a lace region 16 and a lower region 17 are generally defined. Lace region 16 generally encompasses an area where lace apertures 33 or other lace-receiving elements are located, and lower region 17 generally encompasses an area where upper 30 joins with sole structure 20. Regions 16 and 17 are not intended to demarcate precise areas of footwear 10, including upper 30. Rather, regions 16 and 17 are intended to represent general areas to aid in the following discussion.

Strand Configuration

Although a variety of material elements or other components may be incorporated into upper 30, areas of one or both of lateral side 14 and medial side 15 incorporate various first strands 41 and second strands 42 that extend downward from the various lace apertures 33. More generally, strands 41 and 42 extend from lace region 16 to lower region 17. Although the number of strands 41 and 42 may vary significantly, FIGS. 1 and 2 depict two first strands 41 and two second strands 42 extending downward from each lace aperture 33 and toward sole structure 20. Whereas first strands 41 are oriented in a generally vertical direction in an area between lace apertures 33 and sole structure 20, second strands 42 are oriented in a rearwardly-angled direction in the area between lace apertures 33 and sole structure 20. As discussed in greater detail below, these orientations for strands 41 and 42 assist with cutting motions (i.e., side-to-side movements of the wearer) and braking motions (i.e., slowing the forward momentum of the wearer).

When incorporated into upper 30, strands 41 and 42 may be located between a base layer 43 and a cover layer 44, as depicted in FIG. 3. Whereas base layer 43 forms a surface of the void within upper 30, cover layer 44 forms a portion of an exterior or exposed surface of upper 30. The combination of first strands 41, second strands 42, base layer 43, and cover layer 44 may, therefore, form substantially all of a thickness of upper 30 in some areas. Although layers 43 and 44 may be joined to each other in some locations, layers 43 and 44 are often unsecured to each other in areas where strands 41 and 42 are located (e.g., between regions 16 and 17). Also, strands 41 and 42 may be unsecured to layers 43 and 44 in some areas (e.g., between regions 16 and 17). In this configuration, strands 41 and 42 are loosely located between layers 43 and 44. An advantage to a configuration wherein strands 41 and 42 are loose between layers 43 and 44 is that each of strands 41 and 42 may tension, bend, move, or otherwise operate in a generally independent manner within footwear 10.

During activities that involve walking, running, or other ambulatory movements (e.g., cutting, braking), a foot within the void in footwear 10 may tend to stretch upper 30. That is, many of the material elements forming upper 30 may stretch when placed in tension by movements of the foot. Although strands 41 and 42 may also stretch, strands 41 and 42 generally stretch to a lesser degree than the other material elements forming upper 30 (e.g., base layer 43 and cover layer 44). Each of strands 41 and 42 may be located, therefore, to form structural components in upper 30 that (a) resist stretching in specific directions or locations, (b) limit excess movement of the foot relative to sole structure 20 and upper 30, (c) ensure that the foot remains properly positioned relative to sole structure 20 and upper 30, and (d) reinforce locations where forces are concentrated.

First strands 41 extend between lace apertures 33 and sole structure 20 (i.e., between regions 16 and 17) to resist stretch in the medial-lateral direction (i.e., in a direction extending around upper 30). Referring to FIGS. 1 and 2, first strands 41 are oriented in a generally vertical direction in an area between lace apertures 33 and sole structure 20. Although sides 14 and 15 of upper 30 may bulge, protrude, or otherwise extend outward to form a somewhat curved surface, first strands 41 have a generally vertical orientation and follow a relatively short path between lace apertures 33 and sole structure 20. When performing a cutting motion (i.e., side-to-side movement of the wearer), first strands 41 resist sideways movement of the foot to ensure that the foot remains properly positioned relative to footwear 10. That is, first strands 41 resist stretch in upper 30 that may otherwise allow the foot to roll off of sole structure 20. Accordingly, first strands 41 resist stretch in upper 30 due to cutting motions and ensure that the foot remains properly positioned relative to footwear 10.

Figure 4:
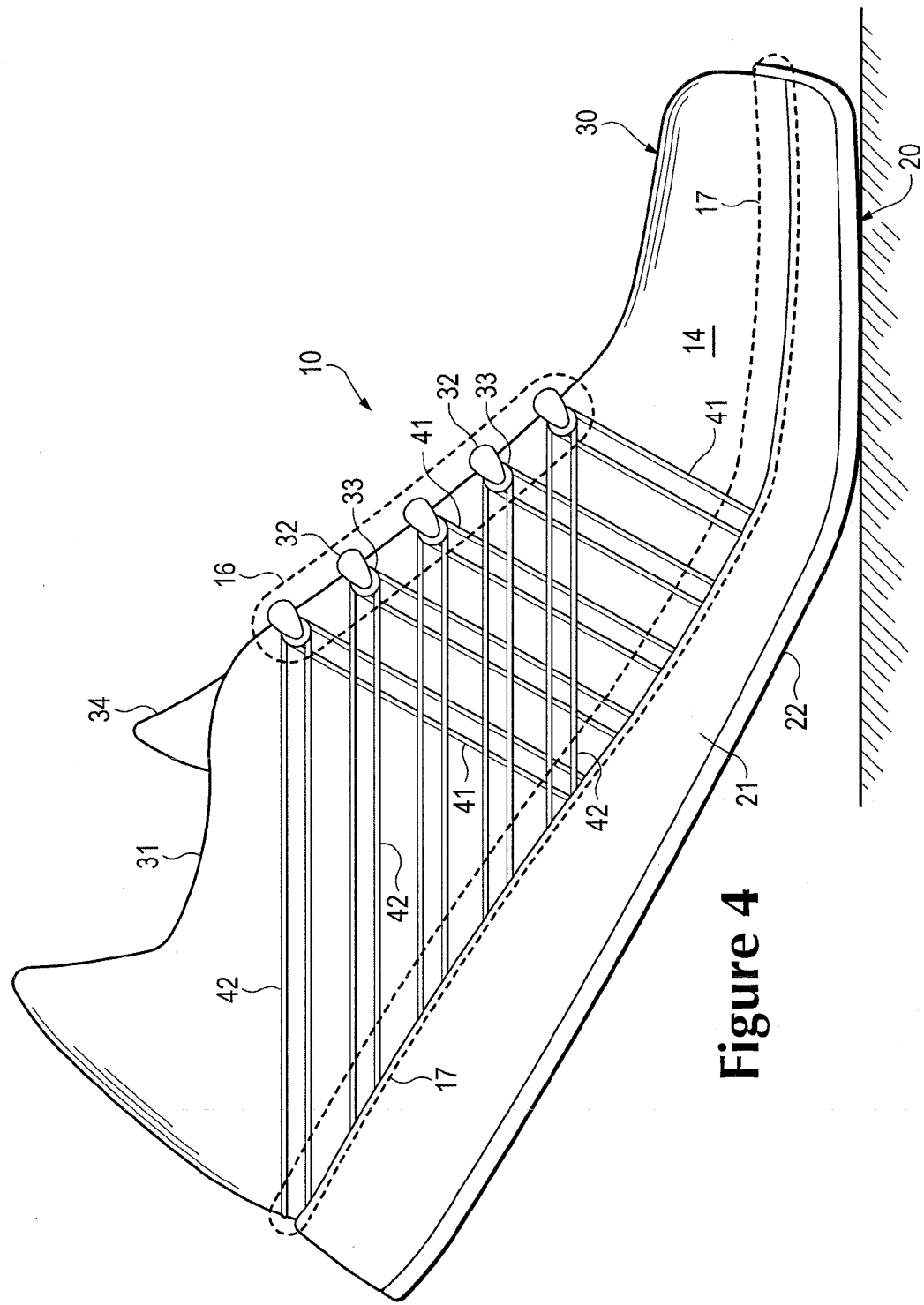
FIG. 4 is a lateral side elevational view of the article of footwear in a flexed configuration.

Second strands 42 are oriented in a rearwardly-angled direction in the area between lace apertures 33 and sole structure 20 (i.e., between regions 16 and 17). When performing a braking motion (i.e., slowing the forward momentum of the wearer), second strands 42 resist stretch in upper 30 that may allow the foot to slide forward or separate from sole structure 20. Second strands 42 also resist stretch in upper 30 due to flexing of footwear 10 in the area between forefoot region 11 and midfoot region 12. Referring to FIG. 4, footwear 10 is depicted in a flexed configuration that occurs when the wearer is jumping or running, for example. When flexed or bent in this manner, the heel area of the foot may tend to separate from sole structure 20 or otherwise lift away from the area where sole structure 20 is secured to upper 30. The rearwardly-angled orientation of second strands 41, however, ensure that the heel area of the foot remains properly positioned in upper 30 and relative to sole structure 20. Accordingly, second strands 42 resist stretch in upper 30 due to braking motions, as well as jumping and running motions that flex or otherwise bend footwear 10.

First strands 41 are oriented in a generally vertical direction and second strands 41 are oriented in a rearwardly-angled direction in the area between lace apertures 33 and sole structure 20. With regard to first strands 41, the upper portions of first strands 41 (i.e., the portions located proximal to lace apertures 33) are generally aligned with the lower portions of first strands 41 (i.e., the portions located proximal to sole structure 20). In this configuration, the upper portions of first strands 41 are located at approximately the same distance from a front of footwear 10 as the lower portions of first strands 41. In this configuration also, a majority of first strands 41 are wholly located in midfoot region 12. Although first strands 41 may have a vertical orientation, the angle of first strands 41 may also have a substantially vertical orientation between zero and fifteen degrees from vertical. As utilized herein, the term "substantially vertical orientation" and similar variants thereof is defined as an orientation wherein first strands 41 are oriented between zero and fifteen degrees from vertical when viewed from a side of footwear 10 (as in FIGS. 1 and 2).

With regard to second strands 42, the upper portions of second strands 42 (i.e., the portions located proximal to lace apertures 33) are offset from the lower portions of second strands 42 (i.e., the portions located proximal to sole structure 20). In this configuration, the upper portions of second strands 42 are located closer to a front of footwear 10 than the lower portions of first strands 41. In this configuration also, a majority of second strands 42 extend from midfoot region 12 to heel region 13. Although the orientation of second strands 42 may vary, the angle of second strands 42 may be from between twenty to more than seventy degrees from vertical.

Given the orientations and angles of strands 41 and 42 discussed above, the angle formed between strands 41 and 42 may range from twenty to more than sixty degrees, for example. Whereas first strands 41 assist with cutting motions, second strands 42 assist with braking motions. In order for strands 41 and 42 to assist with these different motions, the angle formed between strands 41 and 42 may be large enough to counter or otherwise resist stretch in upper 20 associated with these motions. Although the angle formed between strands 41 and 42 may range from twenty to more than sixty degrees, the angle formed between strands 41 and 42 will often be greater than 40 degrees in order to effectively assist with both cutting and braking motions.

As discussed in greater detail below, suitable materials for strands 41 and 42 include various filaments, fibers, yarns, threads, cables, or ropes that are formed from rayon, nylon, polyester, polyacrylic, silk, cotton, carbon, glass, aramids (e.g., para-aramid fibers and meta-aramid fibers), ultra high molecular weight polyethylene, liquid crystal polymer, copper, aluminum, or steel, for example. Although strands 41 and 42 may be formed from similar materials, second strands 42 may be formed to have a greater tensile strength than first strands 41. As an example, strands 41 and 42 may be formed from the same material, but the thickness of second strands 42 may be greater than the thickness of first strands 41 to impart greater tensile strength. As another example, strands 41 and 42 may be formed from different materials, with the tensile strength of the material forming second strands 42 being greater than the tensile strength of the material forming first strands 41. The rationale for this difference between strands 41 and 42 is that the forces induced in upper 30 during braking motions are often greater than the forces induced in upper 30 during cutting motions. In order to account for the differences in the forces from braking and cutting, strands 41 and 42 may exhibit different tensile strengths.

Various factors may affect the relative tensile strengths of strands 41 and 42, including the size of footwear 10, the athletic activity for which footwear 10 is designed, and the degree to which layers 43 and 44 stretch. Additionally, the tensile strengths of strands 41 and 42 may depend upon (a) the number of strands 41 and 42 present in footwear 10 or in an area of footwear 10, (b) the specific locations of individual strands 41 and 42 or groups of strands 41 and 42, and (c) the materials forming strands 41 and 42. Although variable, the tensile strength of second strands 42 may range from fifty to more than three hundred percent greater than the tensile strength of first strands 41. In order to achieve different tensile strengths between strands 41 and 42, different materials or thicknesses of materials may be utilized for strands 41 and 42, for example. As an example of suitable materials, first strands 41 may be formed from a bonded nylon 6.6 with a breaking or tensile strength of 3.1 kilograms and a weight of 45 tex (i.e., a weight of 45 grams per kilometer of material) and second strands 42 may be formed from a bonded nylon 6.6 with a breaking or tensile strength of 6.2 kilograms and a tex of 45. In this configuration, the tensile strength of second strands 42 is one hundred percent greater than the tensile strength of first strands 41.

Tensile Strand Element

Figure 5:
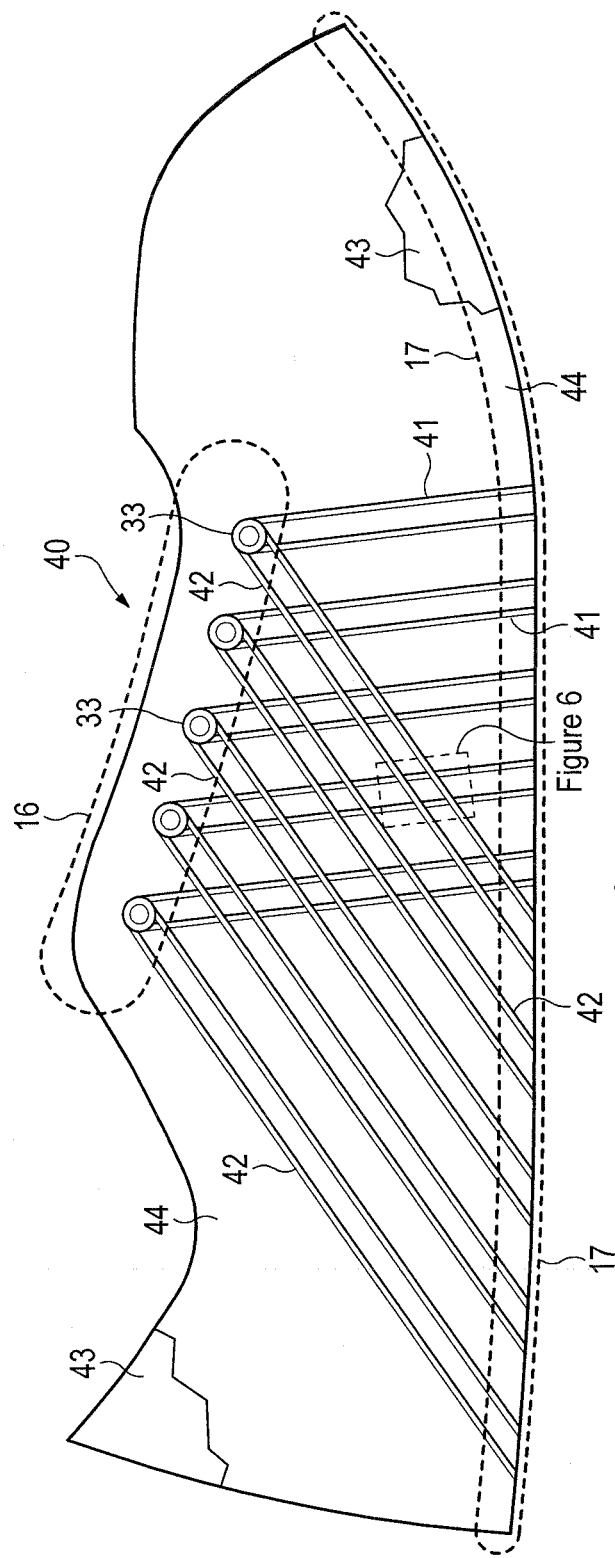
FIG. 5 is a plan view of a tensile strand element utilized in an upper of the article of footwear.
Figure 6:
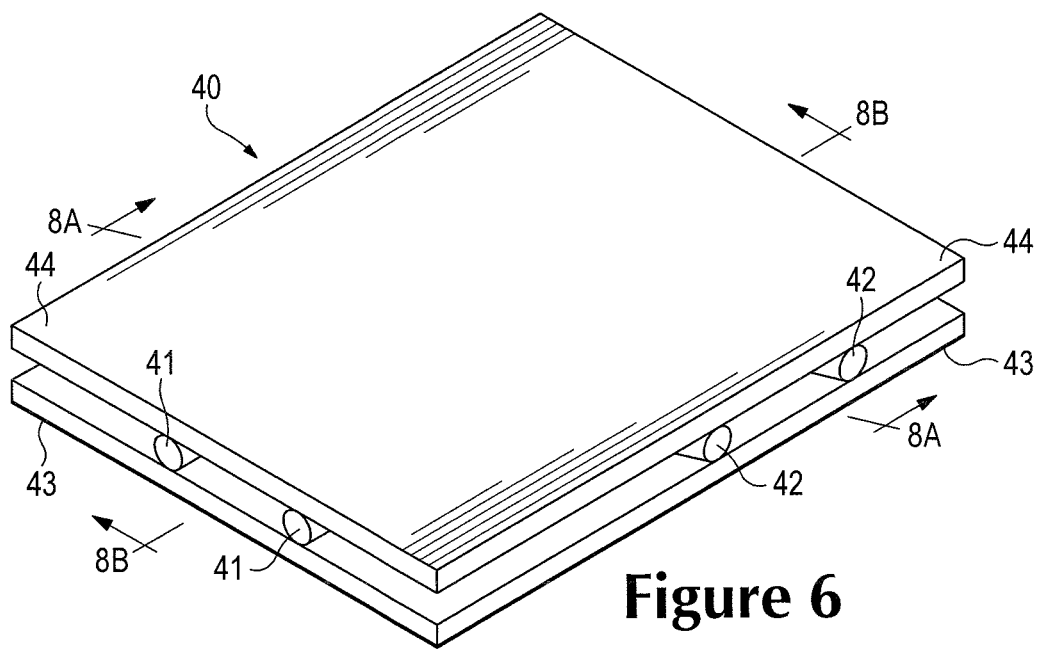
FIG. 6 is a perspective view of a portion of the tensile strand element, as defined in FIG. 5.
Figure 7:
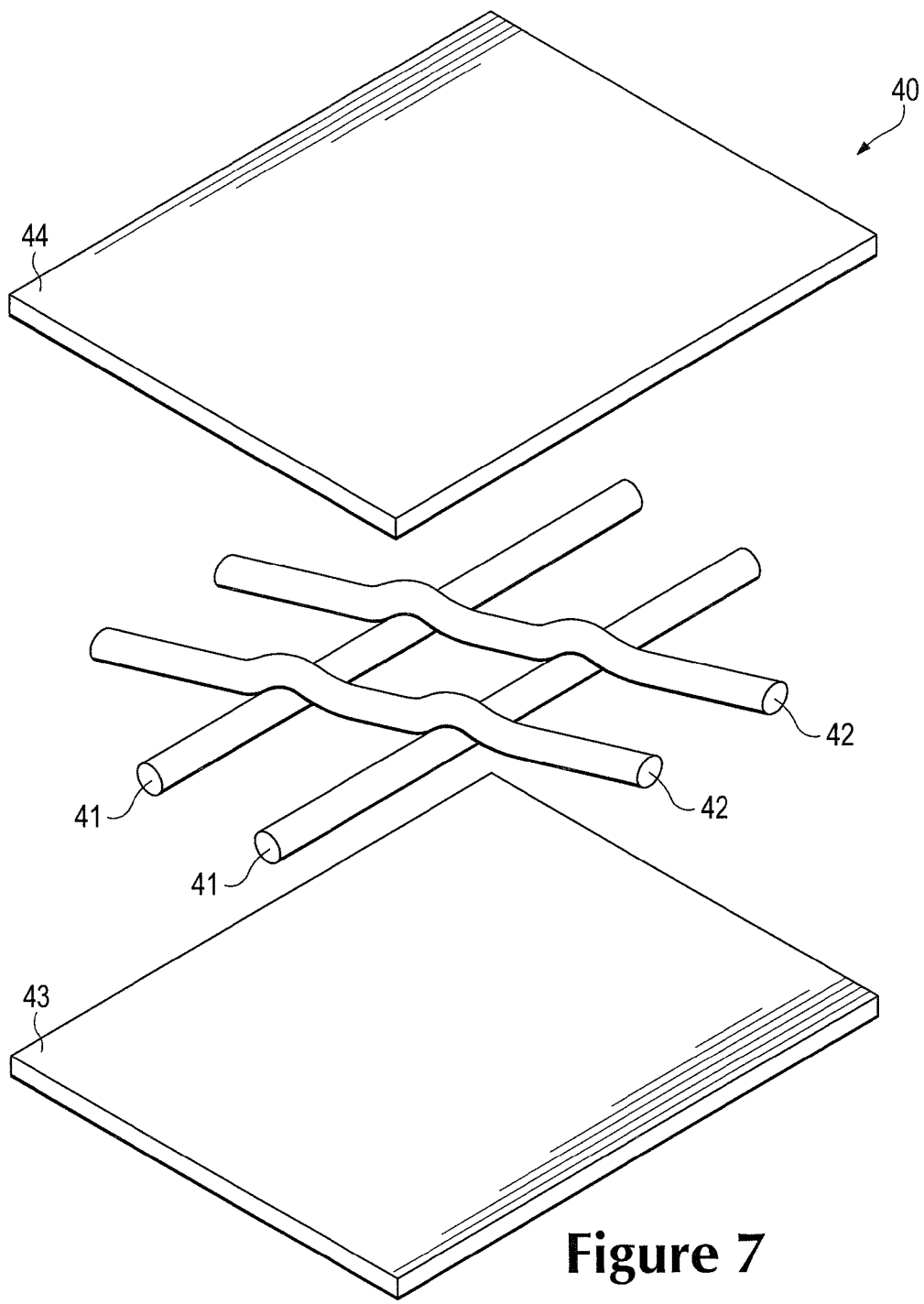
FIG. 7 is an exploded perspective view of the portion of the tensile strand element.
Figure 8A:
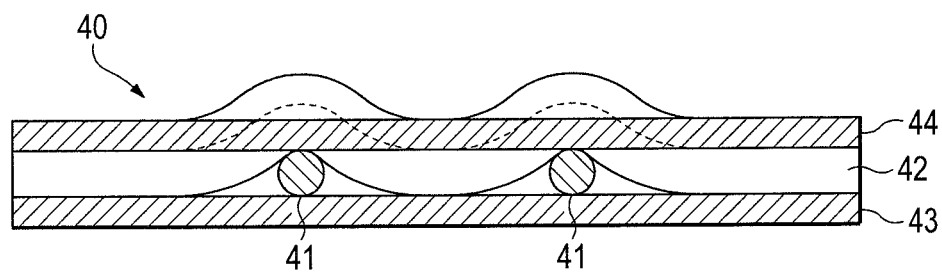
FIGS. 8A and 8B are a cross-sectional views of the portion of the tensile strand element, as defined by section lines 8A and 8B in FIG. 6.
Figure 8B:
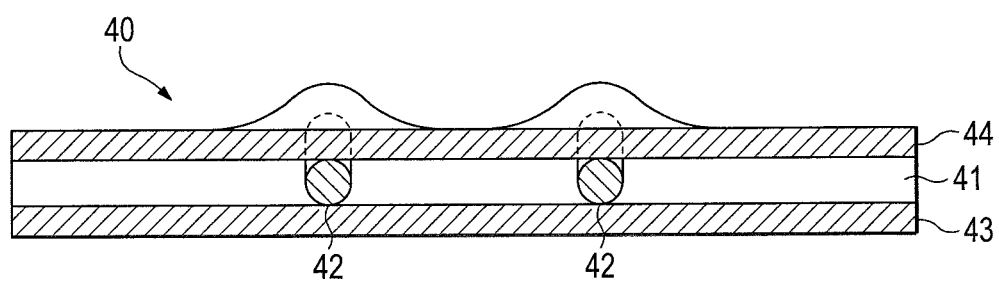

A tensile strand element 40 that may be incorporated into upper 30 is depicted in FIG. 5. Additionally, a portion of element 40 is depicted in each of FIGS. 6-8B. Element 40 may form, for example, a majority of lateral side 14. As a result, element 40 has a configuration that (a) extends from upper to lower areas of lateral side 14 and through each of regions 11-13, (b) defines the various lace apertures 33 in lateral side 14, and (c) forms both an interior surface (i.e., the surface that contacts the foot or a sock worn by the foot when footwear 10 is worn) and an exterior surface (i.e., an outer, exposed surface of footwear 10). A substantially similar element may also be utilized for medial side 15. In some configurations of footwear 10, element 40 may only extend through a portion of lateral side 14 (e.g., limited to midfoot region 12) or may be expanded to form a majority of lateral side 14 and medial side 15. That is, a single element having the general configuration of element 40 and including strands 41 and 42 and layers 43 and 44 may extend through both lateral side 14 and medial side 15. In other configurations, additional elements may be joined to element 40 to form portions of lateral side 14.

Base layer 43 and cover layer 44 lay adjacent to each other, with strands 41 and 42 being loosely positioned between layers 43 and 44. Strands 41 and 42 lie adjacent to a surfaces of layers 43 and 44 and substantially parallel to the surfaces of layers 43 and 44. As discussed above, strands 41 and 42 form structural components in upper 30 that resist stretch. By being substantially parallel to the surfaces of base layer 43 and cover layer 44, strands 41 and 42 resist stretch in directions that correspond with the surfaces of layers 43 and 44. Although strands 41 and 42 may extend through base layer 43 (e.g., as a result of stitching) in some locations, areas where strands 41 and 42 extend through base layer 43 may permit stretch, thereby reducing the overall ability of strands 41 and 42 to limit stretch. As a result, each of strands 41 and 42 generally lie adjacent to the surfaces of layers 43 and 44 and substantially parallel to the surfaces for distances of at least twelve millimeters, and may lie adjacent to the surfaces throughout distances of five centimeters or more.

Base layer 43 and cover layer 44 are depicted as being coextensive with each other. That is, layers 43 and 44 may have the same shape and size, such that edges of base layer 43 correspond and are even with edges of cover layer 44. In some manufacturing processes, (a) strands 41 and 42 are located upon base layer 43, (b) cover layer 44 is placed over base layer 43 and strands 41 and 42, and (c) element 40 is cut from this combination to have the desired shape and size, thereby forming common edges for base layer 43 and cover layer 44. In this process, ends of strands 41 and 42 may also extend to edges of layers 43 and 44. Accordingly, edges of layers 43 and 44, as well as ends of strands 41 and 42, may all be positioned at edges of element 40.

As discussed above, layers 43 and 44 may be joined to each other in some locations, and layers 43 and 44 are often unsecured to each other in areas where strands 41 and 42 are located (e.g., between regions 16 and 17). Referring to FIG. 5, for example, edges of layers 43 and 44 may be secured to each other around the perimeter of element 40, including in lace region 16 and lower region 17. In areas that are spaced inward from the edges, including the area between regions 16 and 17, layers 43 and 44 may be unsecured to each other. Additionally, strands 41 and 42 may be secured to one or both of layers 43 and 44 in regions 16 and 17, but are unsecured to layers 43 and 44 in the area between regions 16 and 17. That is, strands 41 and 42 are loosely located between layers 43 and 44 in the area between regions 16 and 17. As noted above, an advantage to a configuration wherein strands 41 and 42 are loose between layers 43 and 44 is that each of strands 41 and 42 may tension, bend, move, or otherwise operate in a generally independent manner within footwear 10.

Although strands 41 and 42 may be secured to portions of layers 43 and 44 (e.g., in either of regions 16 and 17), strands 41 and 42 are unsecured for a distance of at least five centimeters in the area between lace region 16 and lower region 17. By forming element 40 in a manner that loosely-positions strands 41 and 42 between layers 43 and 44 for a distance of at least five centimeters, strands 41 and 42 have sufficient freedom to tension, bend, move, or otherwise operate in a generally independent manner within footwear 10. In the area between regions 16 and 17, layers 43 and 44 are also unsecured to each other. In order to further provide freedom for strands 41 and 42, layers 43 and 44 may be unsecured to each other in an area measuring at least five centimeters by five centimeters. That is, layers 43 and 44 may from an unsecured area measuring at least five centimeters by five centimeters, with strands 41 and 42 being unsecured to layers 43 and 44 in this unsecured area. An advantage to this configuration is that many strands 41 and 42 may pass through the unsecured area between layers 43 and 44.

Each of base layer 43 and cover layer 44 may be formed from any generally two-dimensional material. As utilized with respect to the present invention, the term "two-dimensional material" or variants thereof is intended to encompass generally flat materials exhibiting a length and a width that are substantially greater than a thickness. Accordingly, suitable materials for base layer 43 and cover layer 44 include various textiles, polymer sheets, or combinations of textiles and polymer sheets, for example. Textiles are generally manufactured from fibers, filaments, or yarns that are, for example, either (a) produced directly from webs of fibers by bonding, fusing, or interlocking to construct non-woven fabrics and felts or (b) formed through a mechanical manipulation of yarn to produce a woven or knitted fabric. The textiles may incorporate fibers that are arranged to impart one-directional stretch or multi-directional stretch, and the textiles may include coatings that form a breathable and water-resistant barrier, for example. The polymer sheets may be extruded, rolled, or otherwise formed from a polymer material to exhibit a generally flat aspect. Two-dimensional materials may also encompass laminated or otherwise layered materials that include two or more layers of textiles, polymer sheets, or combinations of textiles and polymer sheets. In addition to textiles and polymer sheets, other two-dimensional materials may be utilized for layers 43 and 44. Although two-dimensional materials may have smooth or generally untextured surfaces, some two-dimensional materials will exhibit textures or other surface characteristics, such as dimpling, protrusions, ribs, or various patterns, for example. Despite the presence of surface characteristics, two-dimensional materials remain generally flat and exhibit a length and a width that are substantially greater than a thickness. In some configurations, mesh materials or perforated materials may be utilized for either or both of layers 43 and 44 to impart greater breathability or air permeability.

First strands 41 and second strands 42 may be formed from any generally one-dimensional material. As utilized with respect to the present invention, the term "one-dimensional material" or variants thereof is intended to encompass generally elongate materials exhibiting a length that is substantially greater than a width and a thickness. Accordingly, suitable materials for strands 41 and 42 include various filaments, fibers, yarns, threads, cables, or ropes that are formed from rayon, nylon, polyester, polyacrylic, silk, cotton, carbon, glass, aramids (e.g., para-aramid fibers and meta-aramid fibers), ultra high molecular weight polyethylene, liquid crystal polymer, copper, aluminum, and steel. Whereas filaments have an indefinite length and may be utilized individually as strands 41 and 42, fibers have a relatively short length and generally go through spinning or twisting processes to produce a strand of suitable length. An individual filament utilized in strands 41 and 42 may be formed form a single material (i.e., a monocomponent filament) or from multiple materials (i.e., a bicomponent filament). Similarly, different filaments may be formed from different materials. As an example, yarns utilized as strands 41 and 42 may include filaments that are each formed from a common material, may include filaments that are each formed from two or more different materials, or may include filaments that are each formed from two or more different materials. Similar concepts also apply to threads, cables, or ropes. The thickness of strands 41 and 42 may also vary significantly to range from less than 0.03 millimeters to more than 5 millimeters, for example. Although one-dimensional materials will often have a cross-section where width and thickness are substantially equal (e.g., a round or square cross-section), some one-dimensional materials may have a width that is greater than a thickness (e.g., a rectangular, oval, or otherwise elongate cross-section). Despite the greater width, a material may be considered one-dimensional if a length of the material is substantially greater than a width and a thickness of the material. As discussed above as an example, first strands 41 may be formed from a bonded nylon 6.6 with a breaking or tensile strength of 3.1 kilograms and a weight of 45 tex and second strands 42 may be formed from a bonded nylon 6.6 with a breaking or tensile strength of 6.2 kilograms and a tex of 45.

As examples, base layer 43 may be formed from a textile material and cover layer 44 may be formed from a polymer sheet that is bonded to the textile material, or each of layers 43 and 44 may be formed from polymer sheets that are bonded to each other. In circumstances where base layer 43 is formed from a textile material, cover layer 44 may incorporate thermoplastic polymer materials that bond with the textile material of base layer 43. That is, by heating cover layer 44, the thermoplastic polymer material of cover layer 44 may bond with the textile material of base layer 43. As an alternative, a thermoplastic polymer material may infiltrate or be bonded with the textile material of base layer 43 in order to bond with cover layer 44. That is, base layer 43 may be a combination of a textile material and a thermoplastic polymer material. An advantage of this configuration is that the thermoplastic polymer material may rigidify or otherwise stabilize the textile material of base layer 43 during the manufacturing process of element 40, including portions of the manufacturing process involving laying strands 41 and 42 upon base layer 43. Another advantage of this configuration is that a backing layer (see backing layer 48 in FIG. 10D) may be bonded to base layer 43 opposite cover layer 44 using the thermoplastic polymer material in some configurations. This general concept is disclosed in U.S. patent application Ser. No. 12/180,235, which was filed in the U.S. Patent and Trademark Office on 25 Jul. 2008 and entitled Composite Element With A Polymer Connecting Layer, such prior application being entirely incorporated herein by reference.

Based upon the above discussion, element 40 generally includes two layers 43 and 44 with strands 41 and 42 located loosely between. Although strands 41 and 42 may be secured to one of layers 43 and 44, strands 41 and 42 generally lie adjacent to surfaces of layers 43 and 44 and substantially parallel to the surfaces layers 43 and 44 for more than twelve millimeters and even more than five millimeters. Whereas a variety of one dimensional materials may be used for strands 41 and 42, one or more two dimensional materials may be used for layers 43 and 44.

Further Footwear Configurations

Figure 9A:
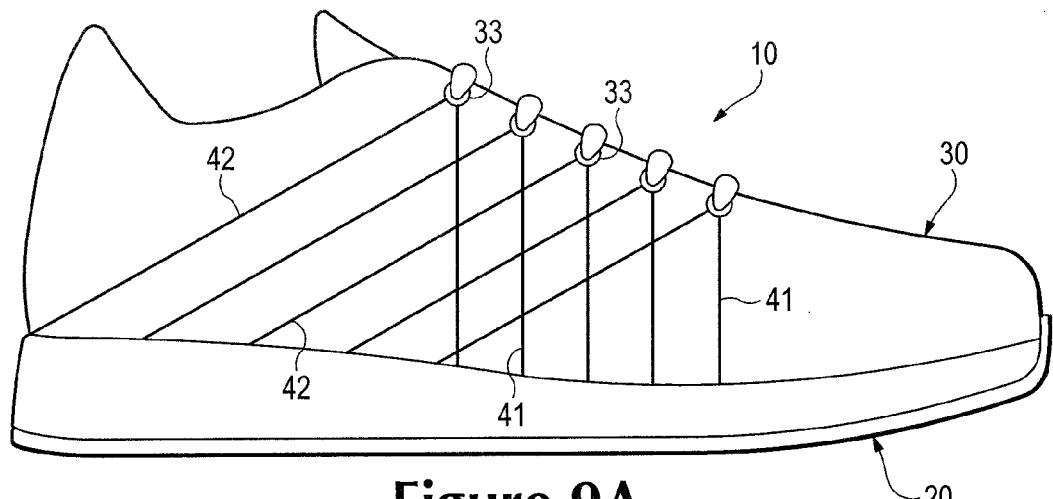
FIGS. 9A-9J are lateral side elevational views corresponding with FIG. 1 and depicting further configurations of the article of footwear.
Figure 9B:
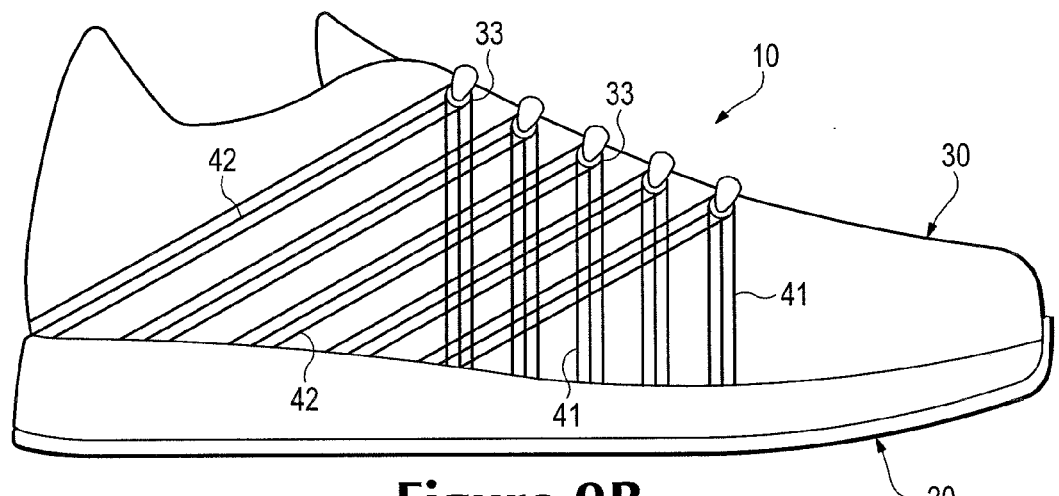
Figure 9C:
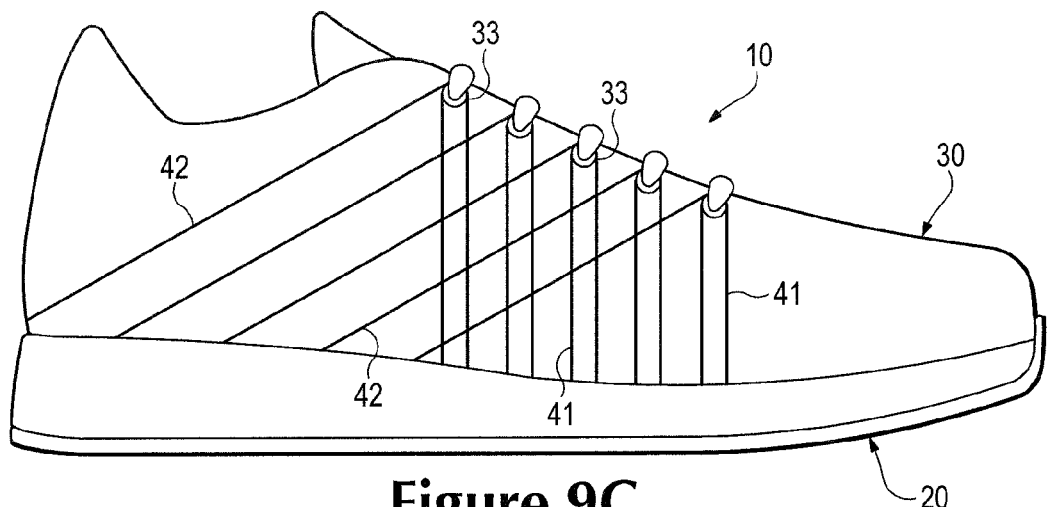
Figure 9D:
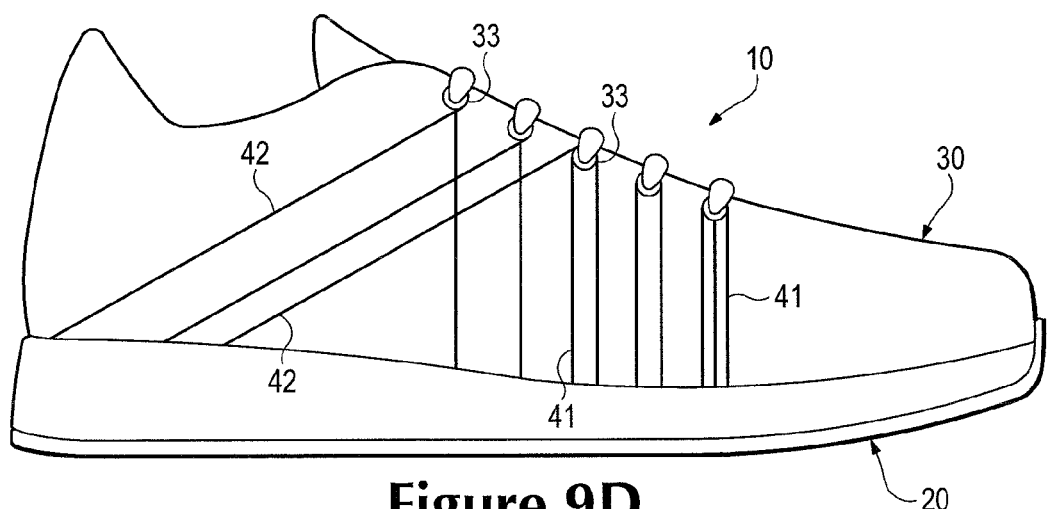
Figure 9E:
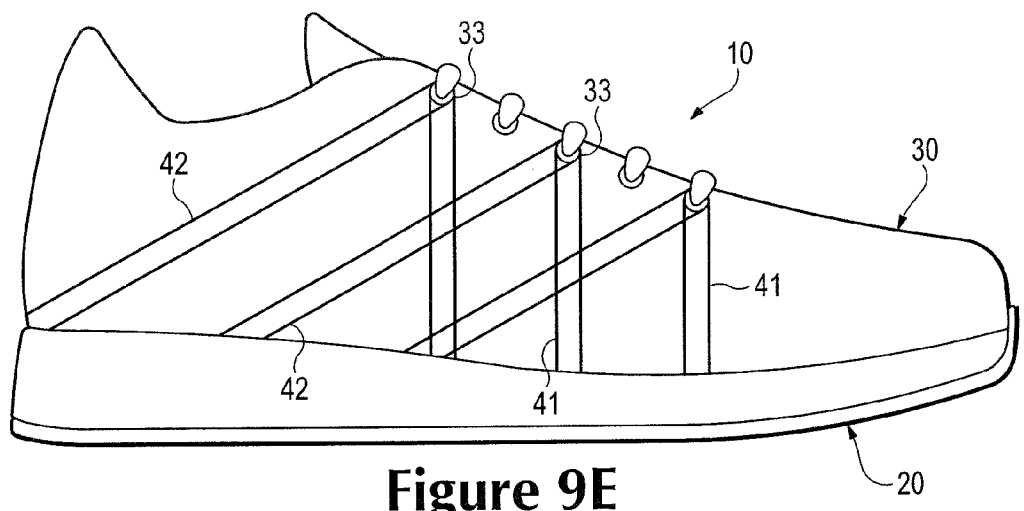

The orientations, locations, and quantity of strands 41 and 42 in FIGS. 1 and 2 are intended to provide an example of a suitable configuration for footwear 10. In other configurations of footwear 10, various strands 41 and 42 may be absent, or additional strands 41 and 42 may be present to provide further structural components in footwear 10. In FIGS. 1 and 2, two first strands 41 and two second strands 42 are associated with each lace aperture 33. Referring to FIG. 9A, a single cutting strand 41 and braking strand 42 extends outward from each lace apertures 33. A configuration wherein three first strands 41 and second strands 42 are associated with each lace aperture 33 is depicted in FIG. 9B. Although the same number of strands 41 and 42 may be associated with each lace aperture 33, FIG. 9C depicts a configuration wherein two first strands 41 and one braking strand 42 extends from each lace aperture 33. Moreover, the number of strands 41 and 42 may vary among the various lace apertures 33, as depicted in FIG. 9D, or some lace apertures 33 may not be associated with strands 41 and 42, as depicted in FIG. 9E. Accordingly, the number of strands 41 and 42 may vary considerably.

Figure 9F:
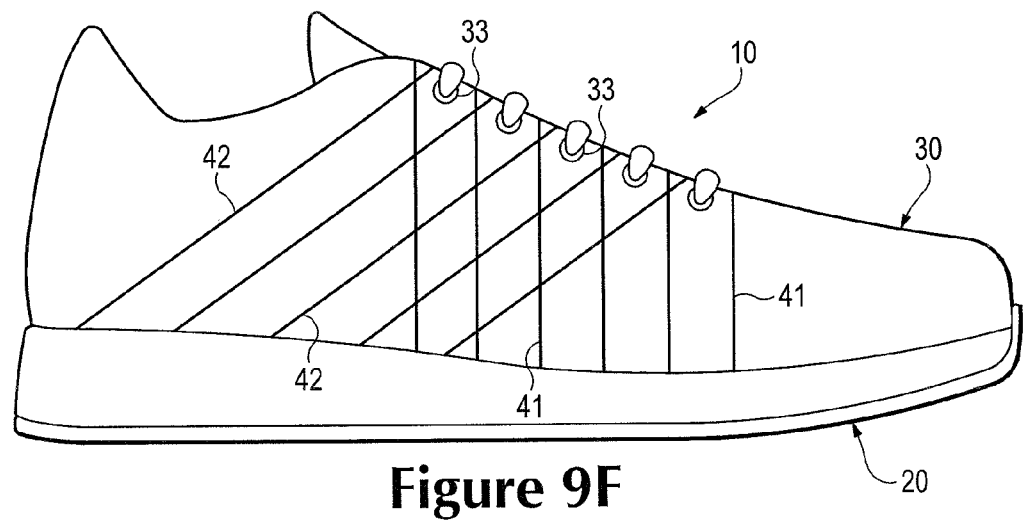
Figure 9G:
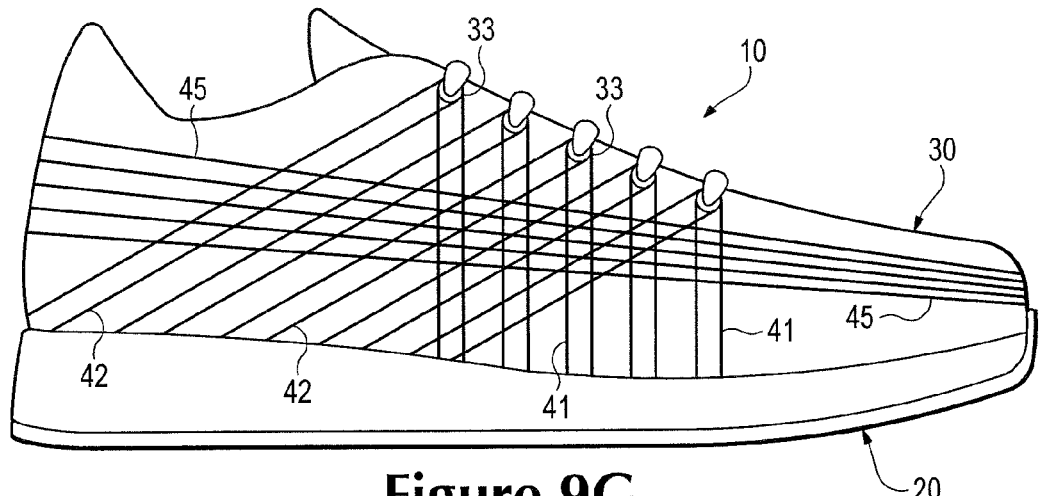
Figure 9H:
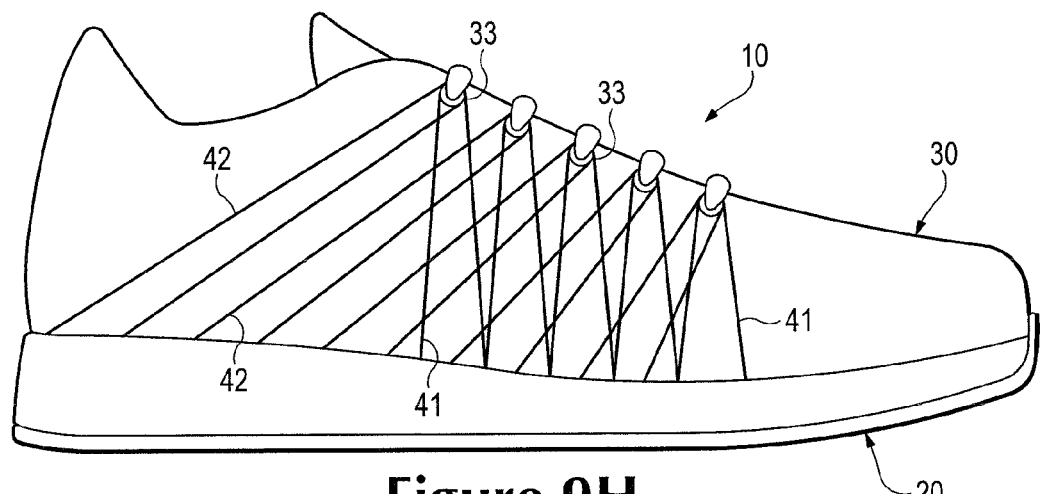
Figure 9I:
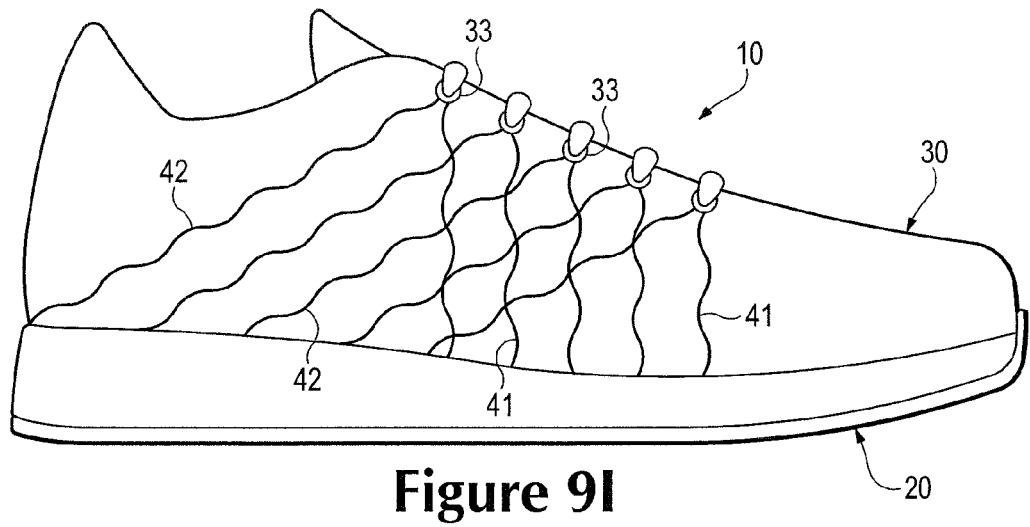

In the various configurations discussed above, strands 41 and 42 extend from lace apertures 33. Although strands 41 and 42 may contact or be in close relation to lace apertures 33, strands 41 and 42 may also extend from areas that are proximal to lace apertures 33. Referring to FIG. 9F, for example, upper portions of strands 41 and 42 are located between or to the side of lace apertures 33. Although strands 41 and 42 cooperatively provide a suitable system for footwear 10, additional strands may also be present in footwear 10. For example, FIG. 9G depicts various longitudinal strands 45 as extending between forefoot region 11 and heel region 13. In the various configurations discussed above, first strands 41 are generally parallel to each other and second strands 42 are generally parallel to each other. Referring to FIG. 9H, however, first strands 41 angle with respect to each other and second strands 42 angle with respect to each other. Although strands 41 and 42 may generally be linear, a configuration wherein portions of strands 41 and 42 are wavy or otherwise non-linear is depicted in FIG. 9I. As discussed above, strands 41 and 42 may resist stretch in upper 30, but the non-linear areas of strands 41 and 42 may allow some stretch in upper 30. As strands 41 and 42 straighten due to the stretch, however, strands 41 and 42 may then resist stretch in upper 30.

Figure 9J:
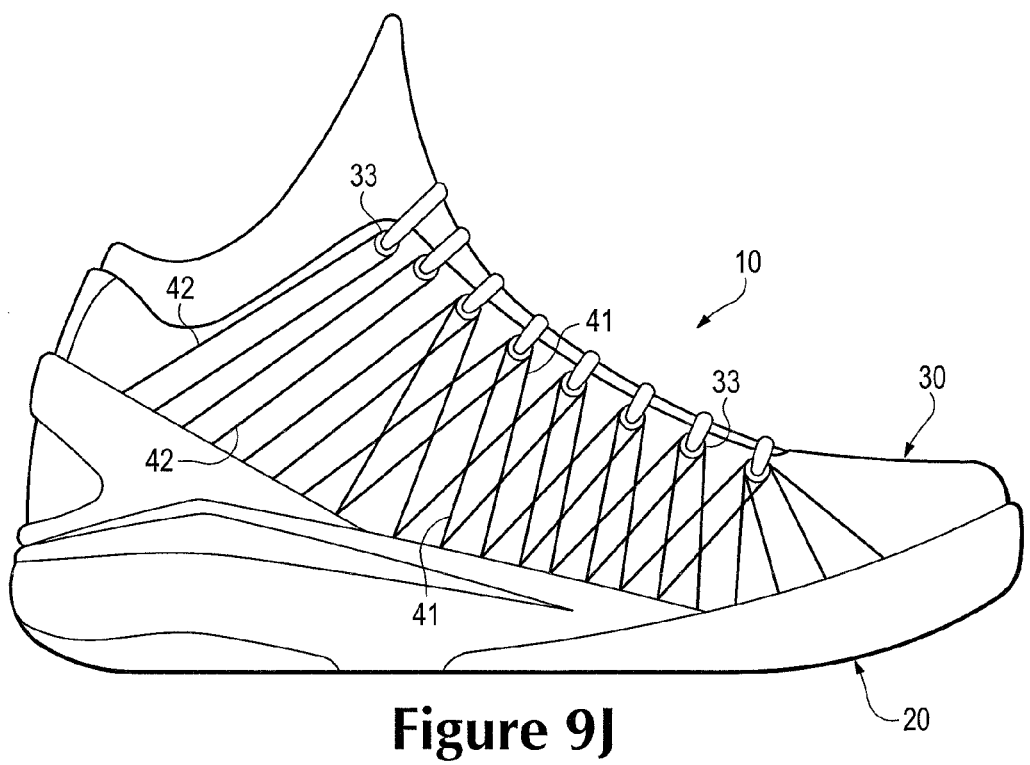

Footwear 10 is disclosed as having a general configuration suitable for walking or running. Concepts associated with footwear 10, may also be applied to a variety of other athletic footwear types. As an example, FIG. 9J depicts footwear 10 as having the configuration of a basketball shoe.

Figure 10A:
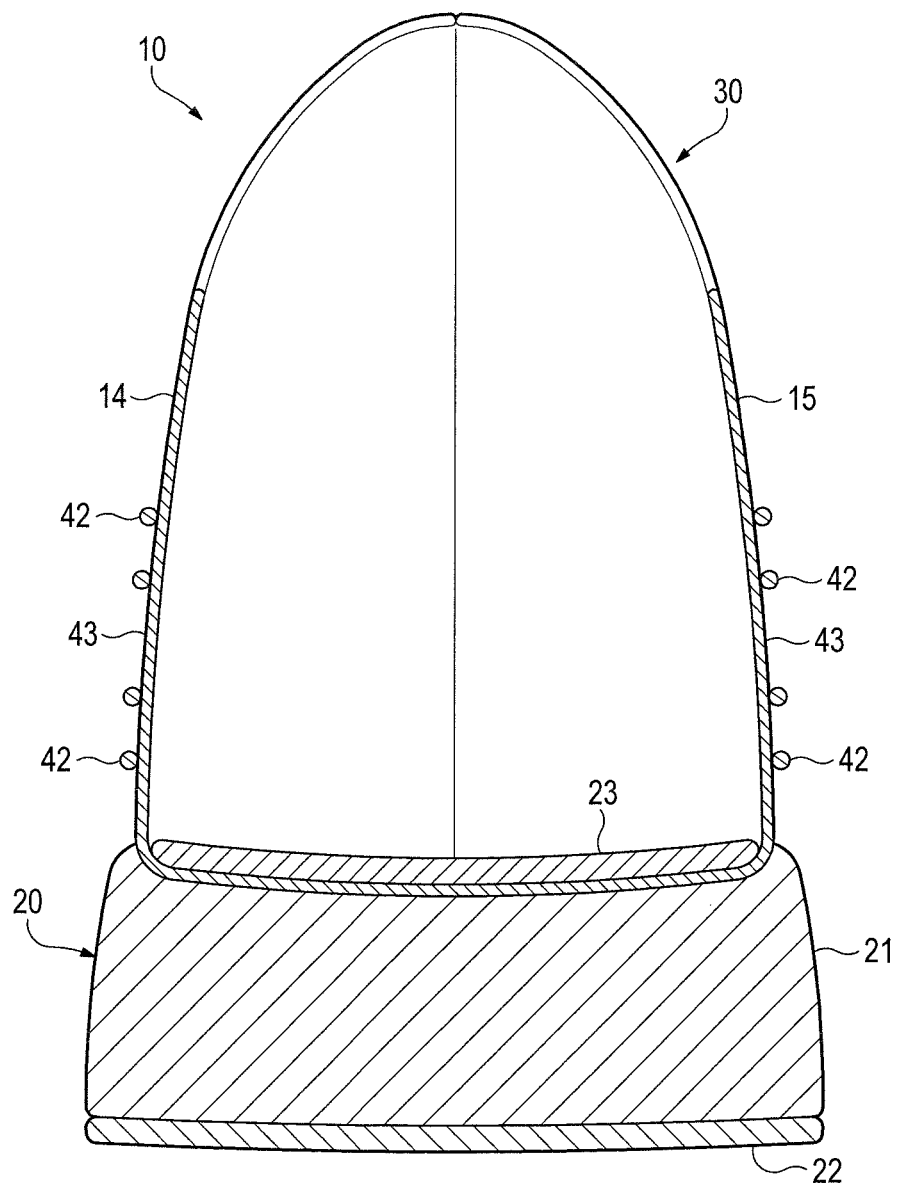
FIGS. 10A-10D are cross-sectional views corresponding with FIG. 3 and depicting further configurations of the article of footwear.
Figure 10B:
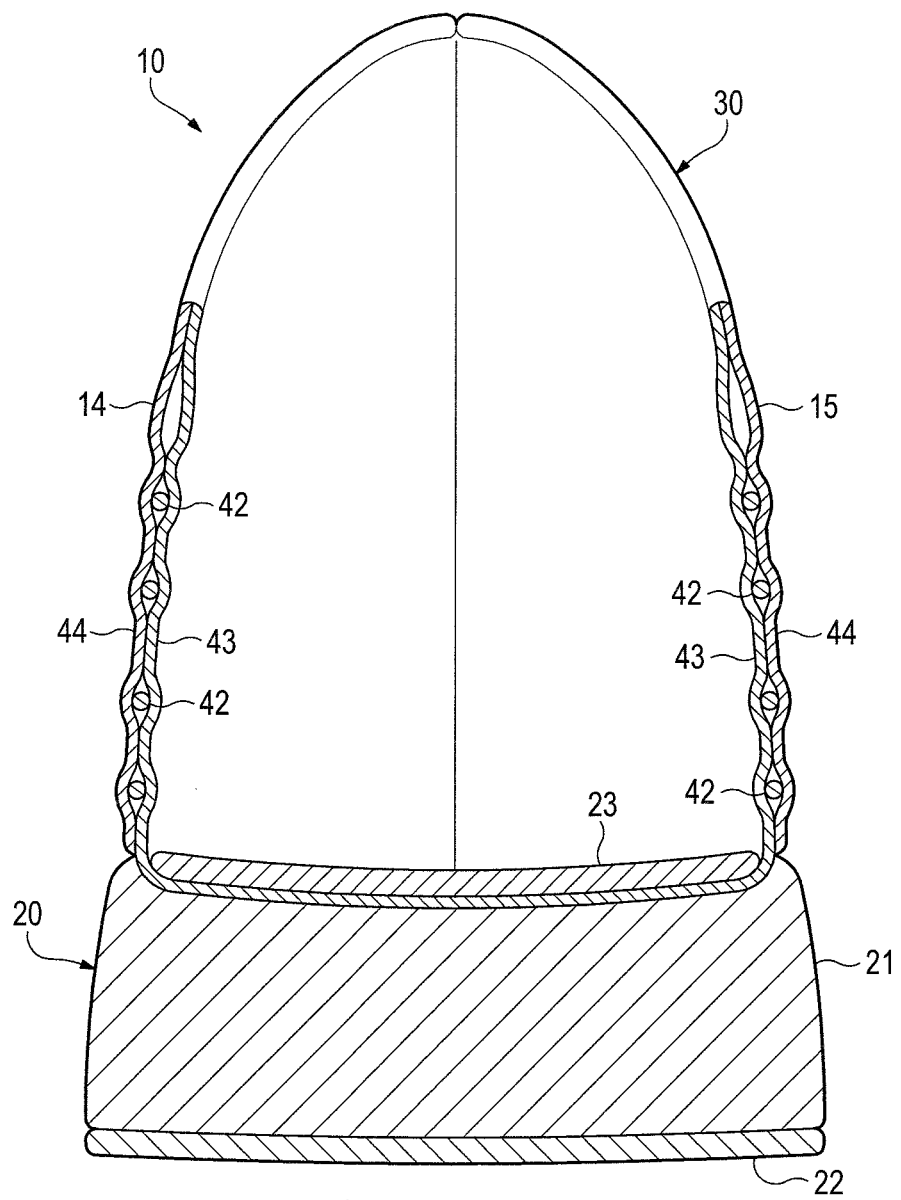
Figure 10C:
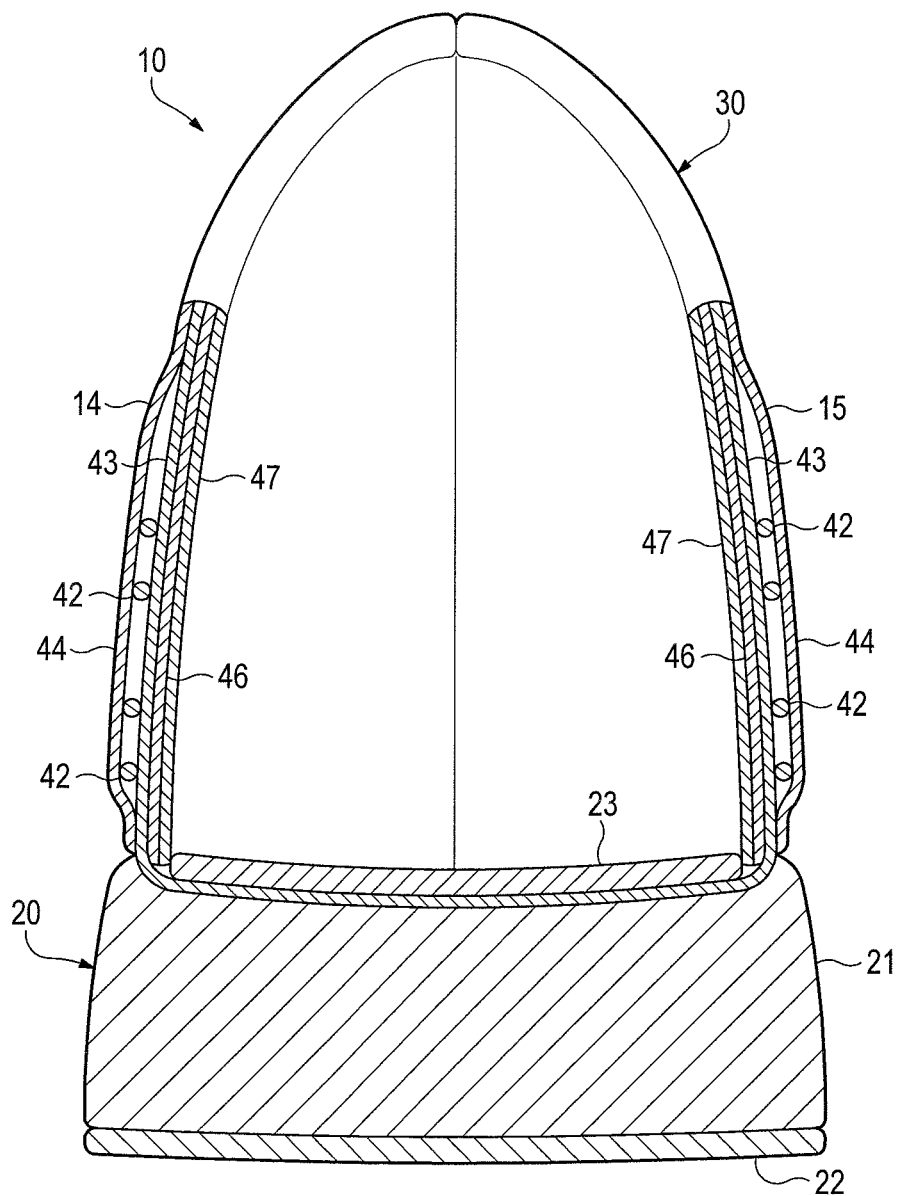
Figure 10D:
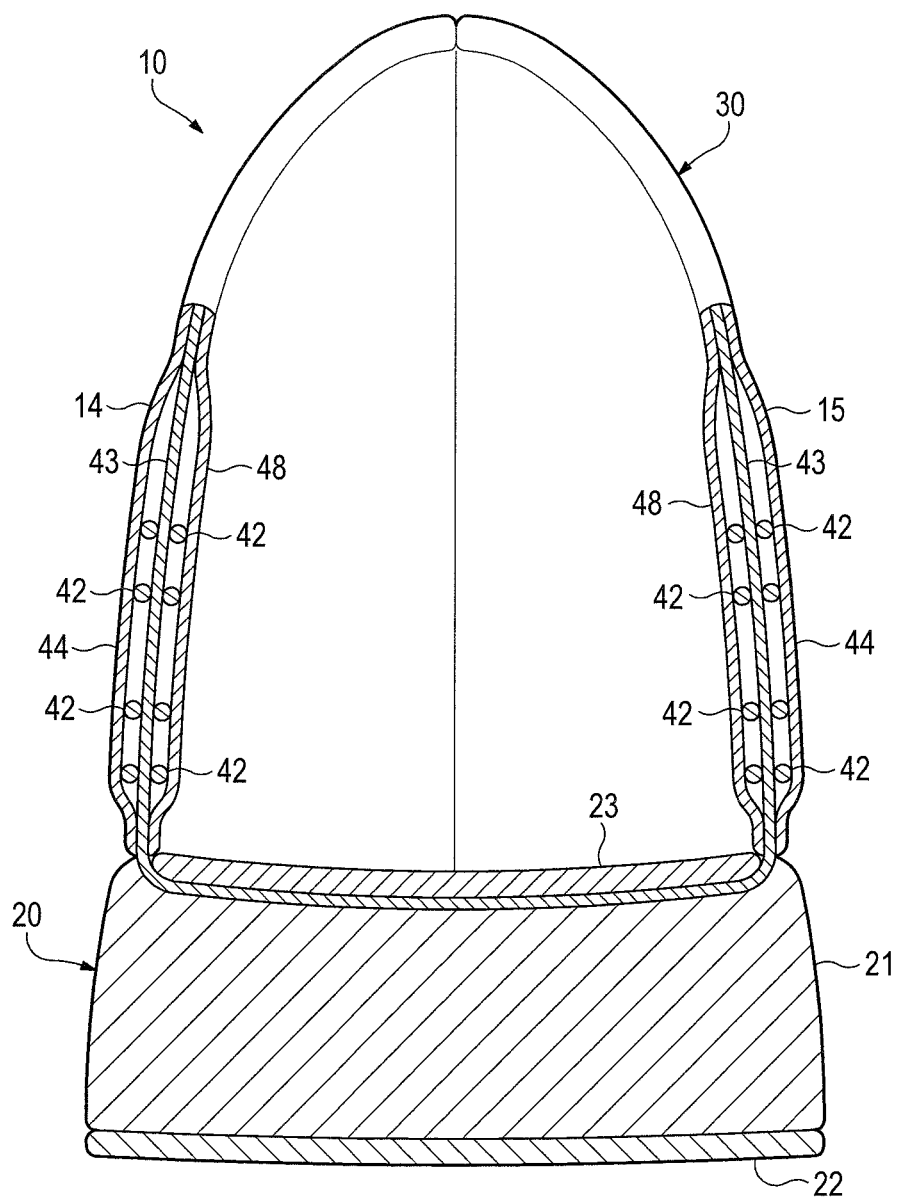

Various aspects relating to strands 41 and 42 and layers 43 and 44 in FIG. 3 are intended to provide an example of a suitable configuration for footwear 10. In other configurations of footwear 10, additional layers or the positions of strands 41 and 42 with respect to layers 43 and 44 may vary. Referring to FIG. 10A, cover layer 44 is absent such that at least strands 42 are exposed on an exterior of upper 30. Referring to FIG. 10B, layers 43 and 44 are secured to each other between strands 42. In another configuration, depicted in FIG. 10C, additional layers 46 and 47 are located to form an interior portion of upper 30 that is adjacent to the void. Although layers 46 and 47 may be formed from various materials, layer 46 may be a polymer foam layer that enhances the overall comfort of footwear 10 and layer 47 may be a moisture-wicking textile that removes perspiration or other moisture from the area immediately adjacent to the foot. Referring to FIG. 10D, an additional set of strands 42 is located on an opposite side of base layer 43, with a backing layer 48 extending over the additional set of strands 42. This configuration may arise when an embroidery process is utilized to locate strands 41 and 42.

Figure 11:
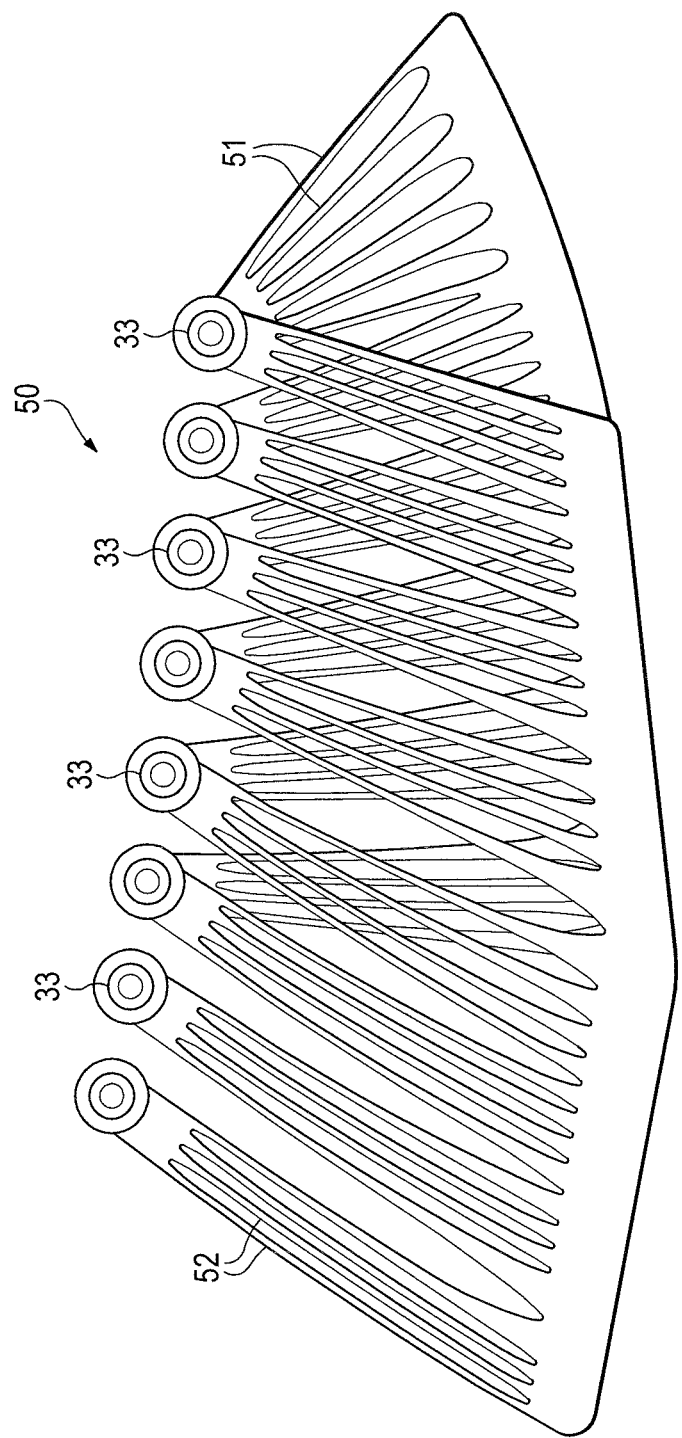
FIG. 11 is a plan view of a tensile element.

A tensile element 50 that may be utilized in place of strands 41 and 42 is depicted in FIG. 11. Tensile element 50 is formed from two joined polymer members. One of the polymer members forms a plurality of first strands 51, and the other polymer member forms a plurality of second strands 52. Moreover, the polymer members are joined to form the various lace apertures 33. Accordingly, structures other than strands 41 and 42 may be utilized to assist with cutting motions and braking motions.

The running style or preferences of an individual may also determine the orientations, locations, and quantity of strands 41 and 42. For example, some individuals may have a relatively high degree of pronation (i.e., an inward roll of the foot), and having a different configuration of strands 41 and 42 may reduce the degree of pronation. Some individuals may also prefer greater stretch resistance during cutting and braking, and footwear 10 may be modified to include further strands 41 and 42 or different orientations of strands 41 and 42 on both sides 14 and 15. Some individuals may also prefer that upper 30 fit more snugly, which may require adding more strands 41 and 42 throughout upper 30. Accordingly, footwear 10 may be customized to the running style or preferences of an individual through changes in the orientations, locations, and quantity of strands 41 and 42.

Manufacturing Method

A variety of methods may be utilized to manufacture upper 30 and, particularly, element 40. As an example, an embroidery process may be utilized to locate strands 41 and 42 relative to base layer 43. Once strands 41 and 42 are positioned, cover layer 44 may be placed over base layer 43 and strands 41 and 42, thereby enclosing strands 41 and 42 within element 40. As an alternative to an embroidery process, other stitching processes may be utilized to locate strands 41 and 42 relative to base layer 43, such as computer stitching. Additionally, processes that involve winding strands 41 and 42 around pegs on a frame around base layer 43 may be utilized to locate strands 41 and 42 over base layer 43. In areas where strands 41 and 42 are secured to layers 43 and 44, and in areas where layers 43 and 44 are secured to each other, stitching, adhesive bonding, thermobonding, or a variety of other attachment techniques may be utilized. Accordingly, a variety of methods may be utilized to locate strands 41 and 42 relative to base layer 43.

CONCLUSION

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

The invention claimed is:

1. An article of footwear having an upper and a sole structure secured to the upper, the upper comprising:
   a lace region defining a plurality of lace-receiving elements;
   a lower region where the sole structure is secured to the upper; and
   a plurality of strands extending from the lace region to the lower region, the strands being secured to the upper in the lace region and the lower region, and the strands being unsecured for a distance of at least five centimeters in an area between the lace region and the lower region;
   the upper further includes a first layer and a second layer that each extend from the lace region to the lower region, the first layer and the second layer are unsecured to each other for said distance of at least five centimeters in the area between the lace region and the lower region;
   wherein the strands are located between the first layer and the second layer through at least said distance of at least five centimeters; and
   wherein the strands include a first strand and a second strand, ends of the first strand and the second strand being proximal to each other in the lace region, and opposite ends of the first strand and the second strand being distally spaced from each other in the lower region.

2. The article of footwear recited in claim 1, wherein the first layer and the second layer are secured to each other in one or more of the lace region and the lower region.

3. The article of footwear recited in claim 1, wherein the first layer and the second layer are secured to each along edges of the lace region and the lower region.

4. The article of footwear recited in claim 1, wherein the strands are secured to at least one of the first layer and the second layer in the lace region.

5. The article of footwear recited in claim 1, wherein the upper consists of the first layer, the second layer, and the strands in at least a portion of the area between the lace region and the lower region.

6. The article of footwear recited in claim 1, wherein the area between the lace region and the lower region measures at least five centimeters by five centimeters.

7. The article of footwear recited in claim 1, wherein [the strands include a first strand and a second strand,] the first strand having a substantially vertical orientation in the area between the lace region and the lower region, and the second strand extending toward a heel region of the footwear in the area between the lace region and the lower region.

8. The article of footwear recited in claim 7, wherein the second strand has greater tensile strength than the first strand.

9. The article of footwear recited in claim 1, wherein at least a portion of the strands cross each other in the area between the lace region and the lower region.

10. An article of footwear having an upper and a sole structure secured to the upper, the upper comprising:
    at least one layer extending from a lace region of the upper to a lower region of the upper; and
    a plurality of strands located adjacent to the layer and in contact with the layer, the strands extending from the lace region to the lower region, and the strands being unsecured to the layer for a distance of at least five centimeters in an area between the lace region and the lower region;
    the lace region of the upper including a plurality of lace-receiving elements;
    wherein the plurality of strands include a first strand and a second strand, ends of the first strand and the second strand being proximal to each other adjacent to at least one of the plurality of lace-receiving elements in the lace region, and opposite ends of the first strand and the second strand being spaced from each other in the lower region, the first strand having a substantially vertical orientation in the area between the lace region and the lower region, and the second strand having an orientation extending toward a heel region of the footwear in the area between the lace region and the lower region; and
    wherein the orientation of the first strand and the orientation of the second strand extending away from said at least one of the plurality of lace-receiving elements is configured to form an angle of at least 40 degrees or larger between the first strand and the second strand.

11. The article of footwear recited in claim 10, wherein the angle between the first strand and the second strand is no more than 60 degrees.

12. The article of footwear recited in claim 10, wherein the second strand has greater tensile strength than the first strand.

13. The article of footwear recited in claim 10, wherein at least a portion of the strands cross each other in the area between the lace region and the lower region.

14. An article of footwear having an upper and a sole structure secured to the upper, the upper comprising:
    a first layer and a second layer that each extend from a lace region of the upper to a lower region [of the upper] where the sole structure is secured to the upper, the first layer and the second layer being unsecured to each other for a distance of at least five centimeters in an area between the lace region and the lower region; and a plurality of strands located between and in contact with the first layer and the second layer, the strands extending from the lace region to the lower region, and the strands being unsecured to the first layer and the second layer for t4ae-said distance of at least five centimeters in the area between the lace region and the lower region;

wherein the strands are secured to the upper in the lace region and the lower region; and wherein the strands include a first strand and a second strand, ends of the first strand and the second strand being proximal to each other in the lace region, and opposite ends of the first strand and the second strand being distally spaced from each other in the lower region.

15. The article of footwear recited in claim 14, wherein the first layer forms at least a portion of an exterior surface of the upper, and the second layer forms at least a portion of an interior surface that defines a void within the upper.

16. The article of footwear recited in claim 14, wherein [the strands include a first strand and a second strand,] the first strand having a substantially vertical orientation in the area between the lace region and the lower region, and the second strand extending toward a heel region of the footwear in the area between the lace region and the lower region.

17. The article of footwear recited in claim 16, wherein the second strand has greater tensile strength than the first strand.

18. The article of footwear recited in claim 14, wherein the area between the lace region and the lower region measures at least five centimeters by five centimeters.

19. The article of footwear recited in claim 14, wherein the lace region defines a lace-receiving element and ends of the strands are secured to at least one of the first layer and the second layer proximal to the lace-receiving element.

20. The article of footwear recited in claim 14, wherein the strands radiate outward in the area between the lace region and the lower region.

21. The article of footwear recited in claim 14, wherein at least a portion of the strands cross each other in the area between the lace region and the lower region.

22. The article of footwear recited in claim 14, wherein the upper consists of the first layer, the second layer, and the strands in at least a portion of the area between the lace region and the lower region.

* * * * *